Patented Nov. 19, 1929

1,735,941

UNITED STATES PATENT OFFICE

WILLIAM R. WALDRON, OF WILMINGTON, DELAWARE, ASSIGNOR TO E. I. DU PONT DE NEMOURS & COMPANY, OF WILMINGTON, DELAWARE, A CORPORATION OF DELAWARE

ANTHRACENE DYE AND PROCESS OF MAKING SAME

No Drawing.   Application filed October 25, 1927.   Serial No. 228,695.

This invention relates to coloring matters of the anthracene series and a process of making the same. More particularly it relates to the halogenation of the condensation product of a 2:2'-dimethyl-1:1'-dianthraquinonyl body.

The halogenation of the condensation product of 2:2'-dimethyl-1:1' dianthraquinonyl which product is generally known as pyranthrone has been carried out in several ways. For instance, the product has been brominated in a nitrobenzene medium at elevated temperatures. This procedure gives a dibrom derivative. Another method which has been used is that in which the bromination of the product has been carried out in fuming sulphuric acid containing 10% of free sulphur trioxide, and using iodine as the bromine carrier. When nitrobenzene is used as a solvent or condensing agent it is costly and hard to remove, necessitating the use of alcohol; furthermore, the nitrobenzene is brominated to some extent thereby using up an additional amount of bromine which is wasted. The use of elevated temperatures for bromination results in high equipment cost due to the corrosive action at these temperatures. In addition, the elevated temperatures result in high bromine loss during the carrying out of the halogenation. The dibrom derivative, as prepared in the past, is of a shade not sufficiently red to answer the trade requirements. Furthermore, the brominated product obtained by the fuming sulphuric acid method is not fast to soaping, since approximately half the color on the goods is lost on soaping and, therefore, twice the amount of dye must be used to obtain the same shade on the finished dyed material.

This invention has as an object the production of coloring matter by the halogenation of the condensation product of 2:2'-dimethyl-1:1'-dianthraquinonyl in a water medium without the use of solvents such as nitrobenzene or sulphuric acid and without the use of carriers. A further object is the carrying out the halogenation at ordinary temperatures. A further object is in obtaining a product which is a tribromderivative of the condensation product of 2:2'-dimethyl-1:1'-dianthraquinonyl and which derivative gives a redder shade than the dibrom derivative. Other objects will appear hereinafter.

These objects are accomplished by brominating finely divided condensation product of 2:2' dimethyl-1:1'-dianthraquinonyl suspended in water at ordinary temperatures, thereby obtaining a tribom derivative of this condensation product.

The following example illustrates the present process in one of its preferred forms, but serves merely by way of illustration and not in limitation:—

*Example.*—410 lbs. of the product obtained by the condensation of 2:2'-dimethyl-1:1'-dianthraquinonyl is completely dissolved in 4,100 lbs. of 100% sulphuric acid at 15-35° C. The solution is drowned in sufficient water at 85° C. to reduce the concentration of the sulphuric acid to about 10-15%, thereby precipitating the condensation product of 2:2'-dimethyl-1:1'-dianthraquinonyl in a fine state of subdivision. The suspension is filtered and the finely divided color is washed with water until acid free. The wet color is stirred with enough water in suitable apparatus to make 10,000 lbs. total weight and 1,525 to 1,850 pounds of bromine are added according to the redness of the shade desired; the charge is stirred one to two days at 15-30° C., being sampled at intervals to determine the course of the bromination. When the bromine content has reached approximately 35-37% and the shade is sufficiently red, the charge is filtered and washed with water to remove as much bromine and hydrobromic acid as possible. The filtrate in which they are dissolved is saved for the recovery of the bromine. The color is then stirred with water, the small amount of bromine remaining being boiled off, and the mix is then made alkaline, refiltered and washed alkali free.

The coloring matter obtained is a finely divided paste, which on drying is a carmine red powder, soluble in concentrated sulphuric acid with a dark blue color. It is also soluble in alkaline hydrosulphite with a cherry red shade, dyeing cotton a bluish-red shade which on oxidation gives an orange red shade. This is the tribrom derivative which contains 37.3% bromine by weight and has most probably the formula—

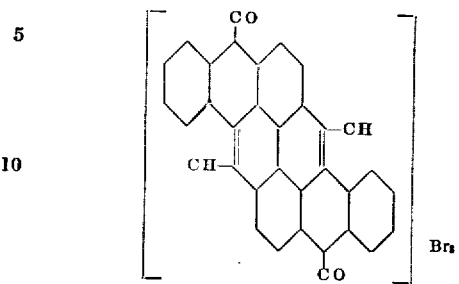

The method of carrying out the described process has many advantages over the prior art processes. Nitrobenzene and sulphuric acid have been replaced by water as the suspension medium for carrying out the halogenation. The bromination is considerably simplified in that it is carried out at room temperatures and, at the same time, permits the production of a tribrom derivative which is much redder and a more desirable commercial product than the dibrom derivatives previously prepared. The bromine loss in the present process is very small and the recovery of bromine from the filtrate which contains hydrobromic acid and bromine is very simple. Furthermore, the color prepared by the present process has only a very slight loss on soaping, and at the same time, the dyed goods are of a more desirable shade than has previously been possible.

The process is susceptible of considerable variation without materially affecting the results. The condensation product of 2:2'-dimethyl-1:1'-dianthraquinonyl when suspended in water will brominate to a certain extent when in any physical form, but the bromination is best carried out and the best results are obtained when the condensation product is in a very finely divided state. This fine state of subdivision may be obtained, as described, by dissolving the color in sulphuric acid, drowning hot or cold, or by crystallizing the color by diluting the acid, or in any other suitable manner. Halogen carriers, such as iodine or finely divided iron, may also be used if desired although their presence is not necessary. Various dispersing agents may be used to keep the color from agglomerating during the course of the bromination. The concentration of the color in the water, the amounts of carrier, dispersing agent, if any, and the temperature may be varied within reasonable limits with little or no effect on the bromination. For instance, if desired, the bromination may be finished by raising the temperature of the reaction mixture to about 60° C. At times, this heating at the end of the operation has been found desirable to produce the desired bromine content and redness of shade.

Suitable changes may be made in the process described without departing from the spirit and scope of the invention.

I claim:

1. The process which comprises the step of treating with bromine the condensation product of 2:2'-dimethyl-1:1'-dianthraquinonyl while said product is suspended in water.

2. The process of claim 1 in which the condensation product is in a finely divided form.

3. The process of claim 1 in which the bromination is carried out at substantially room temperatures.

4. The process of claim 1 in which the bromination is continued until a tribrom derivative is produced.

5. The process which comprises suspending the finely divided condensation product of 2:2'-dimethyl-1:1'-dianthraquinoyl in water, adding bromine to the suspension, maintaining the mixture at a temperature of 15–30° C. until a tribrom derivative of the product is produced and thereafter removing the unreacted bromine.

6. The process of claim 5 in which the suspension is agitated during the bromination.

7. The process which comprises suspending the finely divided condensation product of 2:2'-dimethyl-1:1'-dianthraquinonyl in water and contacting bromine with the suspension until the product contains 34–37% bromine.

8. The process which comprises dissolving the condensation product of 2:2'-dimethyl-1:1'-dianthraquinonyl in concentrated sulphuric acid, drowning said solution in water, filtering the precipitated color from said solution, washing the precipitate free from sulphuric acid, mixing said precipitated color with water to a thin suspension, adding bromine to said suspension, maintaining said bromine-containing suspension at 15–30° C. while stirring for 24–48 hours, filtering off the color and washing the color free from hydrobromic acid and bromine.

9. The pocess which comprises suspending the finely divided condensation product of 2:2'-dimethyl-1:1'-dianthraquinonyl in water, adding bromine to the suspension and maintaining the mixture at a temperature of 15–30° C. for 24–48 hours and then raising the temperature of the mixture to about 60° C.

10. The process which comprises dissolving the condensation product of 2:2'-dimethyl-1:1'-dianthraquinonyl in concentrated sulphuric acid, drowning said solution in water, filtering the precipitated color from said solution, washing the precipitate free from sulphuric acid, mixing said precipitated color with water to a thin suspension, adding bromine to said suspension, maintaining said bromine-containing suspension at 15–30° C. while stirring for 24–48 hours, filtering off the color, washing the color free from hydrobromic acid and bromine, suspending the brominated color in water, boiling the suspension, making the suspension alkaline, filtering off the color from said last named suspension and washing said color.

11. The product obtainable by suspending a finely divided condensation product of 2:2'-dimethyl-1:1'-dianthraquinonyl in water, contacting bromine with the suspension until the product contains 34-37% bromine and thereafter removing the unreacted bromine.

12. A product obtainable by suspending the finely divided condensation product of 2:2'-dimethyl-1:1'-dianthraquinonyl in water, adding bromine to the suspension and maintaining the mixture at a temperature of from 15-30° C. for from 24 to 48 hours.

13. A product obtainable by suspending the finely divided condensation product of 2:2'-dimethyl-1:1'-dianthraquinonyl in water, adding bromine to the suspension and maintaining the mixture at a temperature of from 15-30° C. for from 24 to 48 hours, and then raising the temperature of the mixture to about 60° C.

14. Material dyed with the product of claim 13.

In testimony whereof, I affix my signature.

WILLIAM R. WALDRON.

CERTIFICATE OF CORRECTION.

Patent No. 1,735,941.           Granted November 19, 1929, to

WILLIAM R. WALDRON.

It is hereby certified that error appears in the printed specification of the above numbered patent requiring correction as follows: Page 1, line 84, for "35-37%" read "34-37%"; and that the said Letters Patent should be read with this correction therein that the same may conform to the record of the case in the Patent Office.

Signed and sealed this 17th day of December, A. D. 1929.

(Seal)

M. J. Moore,
Acting Commissioner of Patents.

pending the brominated color in water, boiling the suspension, making the suspension alkaline, filtering off the color from said last named suspension and washing said color.

11. The product obtainable by suspending a finely divided condensation product of 2:2'-dimethyl-1:1'-dianthraquinonyl in water, contacting bromine with the suspension until the product contains 34–37% bromine and thereafter removing the unreacted bromine.

12. A product obtainable by suspending the finely divided condensation product of 2:2'-dimethyl-1:1'-dianthraquinonyl in water, adding bromine to the suspension and maintaining the mixture at a temperature of from 15–30° C. for from 24 to 48 hours.

13. A product obtainable by suspending the finely divided condensation product of 2:2'-dimethyl-1:1'-dianthraquinonyl in water, adding bromine to the suspension and maintaining the mixture at a temperature of from 15–30° C. for from 24 to 48 hours, and then raising the temperature of the mixture to about 60° C.

14. Material dyed with the product of claim 13.

In testimony whereof, I affix my signature.

WILLIAM R. WALDRON.

CERTIFICATE OF CORRECTION.

Patent No. 1,735,941.  Granted November 19, 1929, to

WILLIAM R. WALDRON.

It is hereby certified that error appears in the printed specification of the above numbered patent requiring correction as follows: Page 1, line 84, for "35-37%" read "34-37%"; and that the said Letters Patent should be read with this correction therein that the same may conform to the record of the case in the Patent Office.

Signed and sealed this 17th day of December, A. D. 1929.

(Seal)

M. J. Moore,
Acting Commissioner of Patents.